(12) United States Patent
Fukizawa et al.

(10) Patent No.: US 7,966,706 B2
(45) Date of Patent: Jun. 28, 2011

(54) SWING TYPE ELECTRODE CHIP REPLACEMENT APPARATUS

(75) Inventors: Takeo Fukizawa, Kitanagoya (JP); Toshio Nakajima, Kuwana (JP)

(73) Assignee: Shinkokiki Co., Ltd., Nagoya-Shi (JP)

( * ) Notice: Subject to any disclaimer, the term of this patent is extended or adjusted under 35 U.S.C. 154(b) by 242 days.

(21) Appl. No.: 12/430,997

(22) Filed: Apr. 28, 2009

(65) Prior Publication Data

US 2009/0229099 A1    Sep. 17, 2009

Related U.S. Application Data

(63) Continuation of application No. PCT/JP2007/001057, filed on Sep. 28, 2007.

(30) Foreign Application Priority Data

Nov. 21, 2006   (JP) ................................. 2006-313780

(51) Int. Cl.
  *B23P 19/04* (2006.01)
(52) U.S. Cl. .......................... 29/244; 29/281.1; 269/903
(58) Field of Classification Search .................. 29/244, 29/281.1, 700, 759, 760; 269/903, 291, 295, 269/309–310; 248/279.1, 287.1, 346.07, 248/657, 662; 74/606 R, 813 R–813 L; 219/86.25, 219/86.8
See application file for complete search history.

(56) References Cited

U.S. PATENT DOCUMENTS

| | | | | |
|---|---|---|---|---|
| 4,033,539 | A | * | 7/1977 | Bardocz ..................... 248/228.6 |
| 4,654,964 | A | * | 4/1987 | Schneider et al. ............... 29/705 |
| 5,767,474 | A | * | 6/1998 | Shimada ..................... 219/86.8 |
| 6,327,929 | B1 | * | 12/2001 | Yanagisawa ............... 74/490.09 |
| 7,105,767 | B2 | * | 9/2006 | Izumi et al. .................. 219/86.8 |
| 7,353,578 | B2 | * | 4/2008 | Nakajima et al. ............... 29/239 |
| 2004/0251389 | A1 | * | 12/2004 | Oddsen, Jr. ................ 248/279.1 |
| 2005/0125979 | A1 | * | 6/2005 | Chen ............................ 29/281.1 |
| 2006/0101630 | A1 | | 5/2006 | Nakajima et al. |

FOREIGN PATENT DOCUMENTS

| | | |
|---|---|---|
| JP | 61-041482 U1 | 3/1986 |
| JP | 05-245653 A1 | 9/1993 |
| JP | 2002-079382 A1 | 3/2002 |
| JP | 2006-000859 A1 | 1/2006 |

* cited by examiner

*Primary Examiner* — George Nguyen
(74) *Attorney, Agent, or Firm* — Burr & Brown

(57) ABSTRACT

This invention provides a swing type electrode chip replacement apparatus which enables an electrode chip to be attached/detached without damaging a shank even if the shank is bent. The swing type electrode chip replacement apparatus comprises a fixed plate 20 located in the vicinity of a spot welding machine and a movable plate 21 slidable in the back-forth direction on the fixed plate 20, its front end being swingable in the right-left direction. An attaching unit 1 for attaching an electrode chip 95 to the tip of a shank 90 of a spot welding machine or a magazine of the electrode chip 60 for removing the electrode chip 95 is loaded on this movable plate 21, which is slidable in the back-forth direction and swingable in the right-left direction when the shank 90 comes into contact with the attaching unit 1 or the magazine of electrode chips 60.

11 Claims, 12 Drawing Sheets

Fig. 12
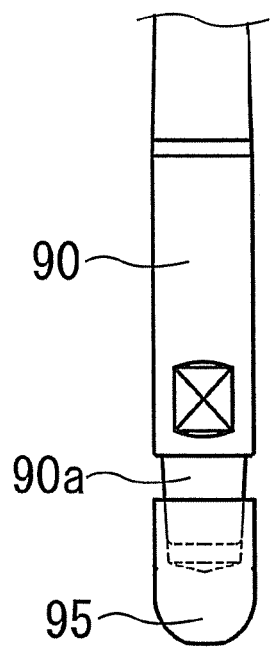
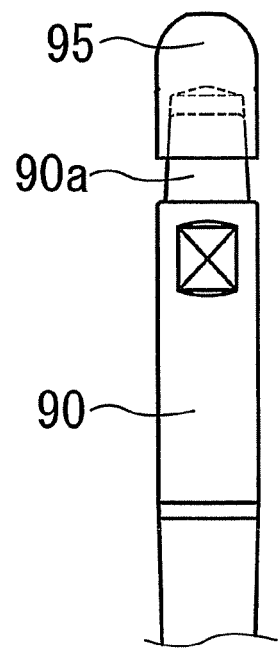

SWING TYPE ELECTRODE CHIP REPLACEMENT APPARATUS

TECHNICAL FIELD

The present invention relates to an electrode chip replacement apparatus for installing or removing an electrode chip to/from a tip of a shank of a spot welding machine.

BACKGROUND ART

Conventionally, as one of the welding means for metallic members, spot welding in which by supplying current with the metallic members press-fit to each other, the metallic members are melted due to resistant heat and joined together has been widely utilized. In this spot welding, as shown in FIG. 12, a welding gun in which an electrode chip 95 is fit to a tapered portion 90a formed at tip of the shank 90 is mounted on a robot arm. During use in a long period, the shape of the tip of the electrode chip 95 is deformed and worn thereby making it difficult to secure a welding quality. Thus, when a predetermined processing time or a predetermined quantity of welding points is exceeded, the electrode chip 95 is removed from tip of the shank 90 and replaced with a new product or a processed one by polishing so as to secure the shape of the tip of the electrode chip 95.

Recently, most welding object members are treated in antirust processing with chemical processing agent, and therefore, there is a tendency that the electrode chip 95 is worn rapidly thereby increasing the replacement frequency. However, replacement of the electrode chip 95 by stopping production line each time reduces production efficiency. Accordingly, there has been proposed an automatic removing unit for the electrode chip 95 in order to replace the electrode chip 95 without necessity of stopping the production line, as shown in patent document 1.

However, in the automatic removing unit of the conventional electrode chip 95 described in this patent document 1, a piece of a fork-like lever is inserted into the tapered portion 90a of the shank 90 and by tilting this lever while butting it against the shank 90 side, the electrode chip 95 is almost forcibly removed by application of the principle of the leverage. This case has a problem that a concentrated load is applied to the shank 90 and a corner of the electrode chip 95 which the lever makes contact with and thus they are likely to be damaged. Another problem is that the amount of insertion of the lever into the tapered portion 90a of the shank 90 is not stabilized thereby producing a removal failure of the electrode chip 95.

Then, an electrode chip removal device as shown in patent document 2 has been proposed. This electrode chip removal device is constituted of a fixed pawl and a movable pawl which opens/closes vertically and a U-shaped insertion portion for introducing the shank is formed in the fixed pawl and movable pawl. The tapered portion 90a of the shank 90 on which the electrode chip 95 is mounted is inserted into the insertion portion of the fixed pawl and the movable pawl and by moving the movable pawl, the fixed pawl and the movable pawl are moved apart from each other so as to remove the electrode chip 95 from the tapered portion 90a of the shank 90.

However, the electrode chip 95 may be sometimes melted and coagulated with a welding object member and if the shank 90 is separated in this condition, the shank 90 can be bent slightly. Further, if the shank 90 strikes a jig or a welding object member, the shank 90 may be bent. If the shank 90 is bent in such a way, sometimes the shank 90 cannot be inserted into the insertion portion of the fixed pawl and the movable pawl and if it is attempted to insert it forcibly, sometimes the shank 90 is damaged.

Patent document 1: Japanese Patent Application Laid-Open No. 2002-79382

Patent document 2: Japanese Patent Application Laid-Open No. 2002-859

DISCLOSURE OF THE INVENTION

Problem to be Solved by the Invention

If tip of the shank is inserted into the insertion portion of the electrode chip removal device when the shank is bent, the shank can be damaged. Accordingly, an object of the invention is to provide an electrode chip replacement apparatus capable of attaching/detaching the electrode chip without any damage to the shank even if it is bent.

Means for Solving the Problem

The feature of the invention described in claim 1 for solving the above-described conventional problem exists in comprising: a fixed plate located in the vicinity of a spot welding machine; and a movable plate which is capable of sliding in the back-forth direction while a front portion thereof is capable of swinging in the right-left direction, the movable plate being disposed on the fixing plate, wherein the movable plate is equipped with an electrode chip replacement means for attaching or detaching an electrode chip to/from tip of the shank of a spot welding machine, the swing type electrode chip replacement apparatus being capable of sliding in the back-forth direction and swinging in the right-left direction when the shank makes a contact with the electrode chip replacement means.

The feature of the invention described in claim 2 exists in further comprising a restricting means for attaching the movable plate to the fixed plate slidably while limiting a motion of the front portion of the movable plate of surpassing a range in which it swings in the right-left direction and slides backward with respect to the fixed plate and a motion of the rear portion of the movable plate of surpassing a range in which it slides backward with respect to the fixed plate.

The feature of the restricting means described in claim 3 exists in being so constructed that a swing concave portion having an elongated hole shaped section is formed concavely in the front portion of any one of the movable plate and the fixed plate; a swing concave portion through hole having a smaller outer edge than the outer edge of the swing concave portion is formed at the bottom portion of the swing concave portion such that it goes through; a swing bolt, which has a head portion accommodated within the swing concave portion and is smaller than the width dimension of the swing concave portion and larger than the width dimension of the swing concave portion through hole, is inserted into the swing concave portion through hole and secured to the other one of the movable plate and the fixed plate; a slide concave portion having an elongated hole shaped section while the front end in the length direction of the elongated hole like shape is directed toward the swing concave portion is formed concavely in the rear portion of one of the movable plate and the fixed plate; a slide concave portion through hole smaller than the outer edge of the slide concave portion is formed at the bottom portion of the slide concave portion such that it goes through; and a slide bolt, which has a head portion accommodated within the slide concave portion and is smaller than the width dimension of the slide concave portion and larger than the width dimension of the slide concave portion through hole, is inserted into the slide concave portion through hole and secured to the other one of the movable plate and the fixed plate.

The feature of the invention described in claim 4 exists in further comprising an urging means for urging the movable plate forward of the fixed plate, the movable plate being always located at the forefront portion of a range in which the movable plate is slidable with respect to the fixed plate.

The feature of the urging means of the invention described in claim 5 exists in being so constructed that a space which is open to a face opposing one of the movable plate and the fixed plate is formed in the other one of the movable plate and the fixed plate; a bar-like member is mounted to one of the movable plate and the fixed plate such that the bar-like member invades into the space while a coil spring for urging the bar-like member is mounted to the other one of the movable plate and the fixed plate.

The feature of the invention described in claim 6 exists in further comprising a restoring means for restoring the front portion of the movable plate to an intermediate portion of a swing range thereof with respect to the fixed plate.

The feature of the restoring means of the invention described in claim 7 exists in being comprised of a block-like member mounted on a central portion in the width direction of one of the movable plate and the fixed plate and coil springs mounted to the other one of the movable plate and the fixed plate for urging the block-like member from both sides in the width direction.

The feature of the invention described in claim 8 exists in that a ball plunger is buried in one of the fixed plate and the movable plate so that the ball portion of the ball plunger makes contact with the other one of the fixed plate and the movable plate, the movable plate being slidable to the fixed plate.

The feature of the invention described in claim 9 exists in further comprising a limit switch for detecting a position in the back-forth direction of the movable plate with respect to the fixed plate.

The feature of the invention described in claim 10 exists in that the electrode chip replacement means is a removing device for fetching out an electrode chip from the tip of a shank of a spot welding machine.

The feature of the invention described in claim 11 exists in that the electrode chip replacement means is a magazine for the electrode chips, which supplies the tip of a shank of a spot welding machine with the electrode chip.

Effect of the Invention

The invention described in claim 1 is characterized in comprising: a fixed plate located in the vicinity of a spot welding machine; and a movable plate which is capable of sliding in the back-forth direction while a front portion thereof is capable of swinging in the right-left direction, the movable plate being disposed on the fixing plate, wherein the movable plate is equipped with an electrode chip replacement means for attaching or detaching an electrode chip to/from tip of the shank of a spot welding machine, the swing type electrode chip replacement apparatus being capable of sliding in the back-forth direction and swinging in the right-left direction when the shank makes a contact with the electrode chip replacement means. Consequently, even if the shank is bent in the right-left direction or in the back-forth direction, the electrode chip can be attached to or detached from the shank without any damage, because the electrode chip replacement means swings in the right-left direction or slides backward.

The invention described in claim 2 is characterized in further comprising a restricting means for attaching the movable plate to the fixed plate slidably while limiting a motion of the front portion of the movable plate of surpassing a range in which it swings in the right-left direction and slides backward with respect to the fixed plate and a motion of the rear portion of the movable plate of surpassing a range in which it slides backward with respect to the fixed plate. Consequently, the movable plate can be mounted to the fixed plate such that the front portion of the movable plate is swingable within a predetermined range in the right-left direction while slidable within a predetermined range in the backward direction.

The restricting means described in claim 3 is characterized in being so constructed that a swing concave portion having an elongated hole shaped section is formed concavely in the front portion of any one of the movable plate and the fixed plate; a swing concave portion through hole having a smaller outer edge than the outer edge of the swing concave portion is formed at the bottom portion of the swing concave portion such that it goes through; a swing bolt smaller than the width dimension of the swing concave portion and larger than the width dimension of the swing concave portion through hole is inserted into the swing concave portion through hole and secured to the other one of the movable plate and the fixed plate; a slide concave portion having an elongated hole shaped section while the front end in the length direction of the elongated hole like shape is directed toward the swing concave portion is formed concavely in the rear portion of one of the movable plate and the fixed plate; a slide concave portion through hole smaller than the outer edge of the slide concave portion is formed at the bottom portion of the slide concave portion such that it goes through; and a slide bolt, the head portion of which is accommodated within the slide concave portion, smaller than the width dimension of the slide concave portion and larger than the width dimension of the slide concave portion through hole, is inserted into the slide concave portion through hole and secured to the other one of the movable plate and the fixed plate. Consequently, the construction which allows the front portion of the movable plate to swing within a predetermined range in the right-left direction with respect to the fixed plate and slide within a predetermined range in the backward direction can be realized.

The invention described in claim 4 is characterized in further comprising an urging means for urging the movable plate forward of the fixed plate, the movable plate being always located at the forefront portion of a range in which the movable plate is slidable with respect to the fixed plate. Consequently, even if the shank is bent forward, the shank can be brought into a contact with the bottom portion of the insertion portion of the electrode chip replacement means securely, so that the electrode chip can be attached to or detached from the shank.

The urging means of the invention described in claim 5 is characterized in being so constructed that a space which is open to a face opposing one of the movable plate and the fixed plate is formed in the other one of the movable plate and the fixed plate; a bar-like member is mounted to one of the movable plate and the fixed plate such that the bar-like member invades into the space while a coil spring for urging the bar-like member is mounted to the other one of the movable plate and the fixed plate. Consequently, the construction which enables the movable plate to always urge to the forefront portion of the range in which it can slide with respect to the fixed plate can be realized.

The invention described in claim 6 is characterized in further comprising a restoring means for restoring the front portion of the movable plate to an intermediate position of a swing range thereof with respect to the fixed plate. As a result, even after the shank is inserted into the insertion portion and then the front portion of the movable plate swings in the right-left direction with respect to the fixed plate, thereby the electrode chip being attached or detached, the front portion of the movable plate is restored to an intermediate position of the swing range with respect to the fixed plate. Consequently, when attaching or detaching the electrode chip to/from the shank again, the shank can be inserted into the insertion portion of the electrode chip replacement means again.

The restoring means of the invention described in claim 7 is characterized in being comprised of a block-like member mounted on a central portion in the width direction of one of the movable plate and the fixed plate and coil springs mounted to the other one of the movable plate and the fixed plate for urging the block-like member from both sides in the width direction. As a result, the construction which allows the front portion of the movable plate to be restored to the intermediate position of the swing range thereof with respect to the fixed plate can be realized.

The invention described in claim 8 is characterized in that a ball plunger is buried in one of the fixed plate and the movable plate so that the ball portion of the ball plunger makes contact with the other one of the fixed plate and the movable plate, the movable plate being slidable to the fixed plate. As a result, the area in which the ball portion of the ball plunger makes contact with the other one of the fixed plate and the movable plate is extremely small and they make contact with each other through smooth faces. Consequently, friction between the movable plate and the fixed plate is small so that the motion of the movable plate with respect to the fixed plate is smoothed and when the shank is inserted into the insertion portion of the electrode chip replacement means and the front portion of the movable plate swings in the right-left direction with respect to the fixed plate or slides backward, the shank can be prevented from being damaged. Further because the movable plate is held by the ball plunger and the movable plate moves vertically with respect to the fixed plate, the electrode chip replacement means moves following up in a vertical direction also when the electrode chip is attached or detached to/from the shank and consequently, the electrode chip can be attached/detached to/from the shank without any damage.

The invention described in claim 9 is characterized in further comprising a limit switch for detecting a position in the back-forth direction of the movable plate with respect to the fixed plate. Consequently, if the shank is bent largely and tip of the shank is not inserted into the insertion portion of the electrode chip replacement means, an abnormality can be detected.

The invention described in claim 10 is characterized in that the electrode chip replacement means is a removing device for fetching out an electrode chip from the tip of a shank of a spot welding machine. Consequently, even if the shank is bent in the right-left direction or in the back-forth direction, the removing device swings in the right-left direction or slides in the backward direction, so that the shank is inserted in between the fixed pawl and the movable pawl, which serve as an insertion portion. As a result, the electrode chip can be removed from the shank without any damage.

The invention described in claim 11 is characterized in that the electrode chip replacement means is a magazine for the electrode chips, which supplies tip of the shank of a spot welding machine with an electrode chip. Consequently, even if the shank is bent, the magazine of the electrode chips swings in the right-left direction or slides in the backward direction, so that the shank is inserted into the guide which serves as an insertion portion. As a result, tip of the shank can be introduced to a supply port of the magazine without any damage, so that the electrode chip can be attached securely without damaging the shank.

BRIEF DESCRIPTION OF THE DRAWINGS

FIG. 12 is an explanatory diagram of the electrode chip of the shank of a welding gun.

DESCRIPTION OF REFERENCE NUMERALS

Figure 1:
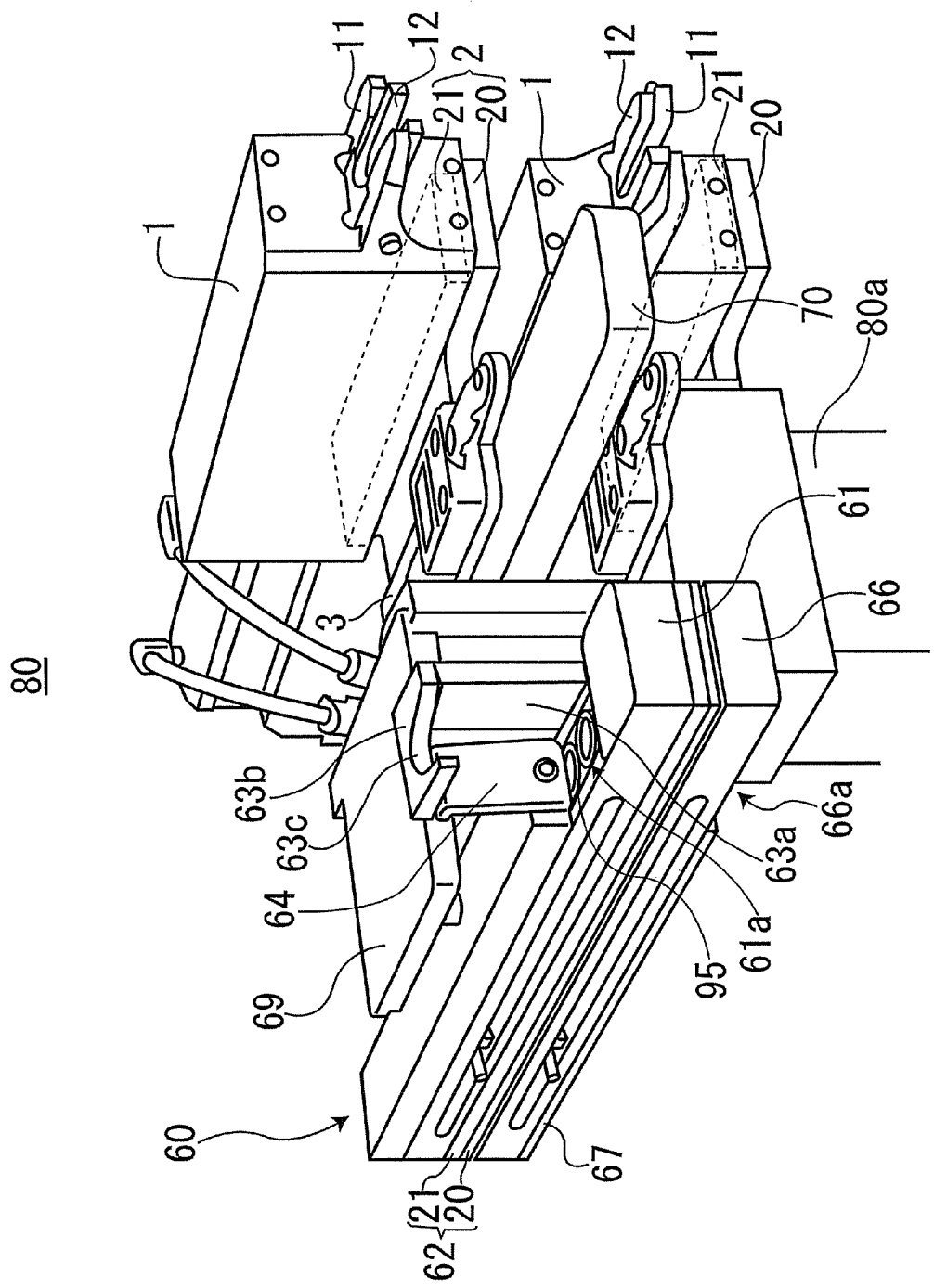
FIG. 1 is a perspective view of a swing type electrode chip replacement apparatus.

1: removing device
2: swing unit (for the removing device)
3: bracket
11: fixed pawl
11a: shank receiving concave portion
11b: shank introducing portion
11c: front end portion of fixed pawl
12: movable pawl
13: shaft portion
20: fixed plate
20a: fixing concave portion
20b: screw hole
20c: fixing concave portion
20d: screw hole
20f: space
20g: spring receiving portion
20h: space
20k: spring receiving portion
20m: limit switch attachment hole
21: movable plate
21a: swing concave portion
21b: swing concave portion through hole
21c: slide concave portion
21d: slide concave portion through hole
21f: mounting hole
21j: mounting hole
22: ball plunger
22a: ball portion
25: bar-like member
26: hexagon socket head bolt
27: coil spring
28: set bolt
29: block-like member
29a: spring receiving concave portion
31: hexagon socket head bolt
32: set bolt
33: coil spring
35: limit switch
35a: detecting portion
50: swing bolt
50a: head portion (swing bolt)
50b: shaft portion (swing bolt)

50c: screw portion (swing bolt)
55: slide bolt
55a: head portion (slide bolt)
55b: shaft portion (slide bolt)
55c: screw portion (slide bolt)
60: magazine of electrode chips
61: upper side magazine of electrode chips
61a: supply port
62: swing unit (for magazine of electrode chips)
63: guide
63a: plate portion
63b: guide portion
63c: shank introduction concave portion
64: cover member
66: lower side magazine of electrode chips
66a: supply port
67: mounting plate
69: mounting bracket
70: sensing plate
80: electrode chip replacement apparatus
80a: supporting post
90: shank
90a: tapered portion of shank
95: electrode chip

BEST MODE FOR CARRYING OUT THE INVENTION

Structure of the Shank and Electrode Chip

Figure 2:
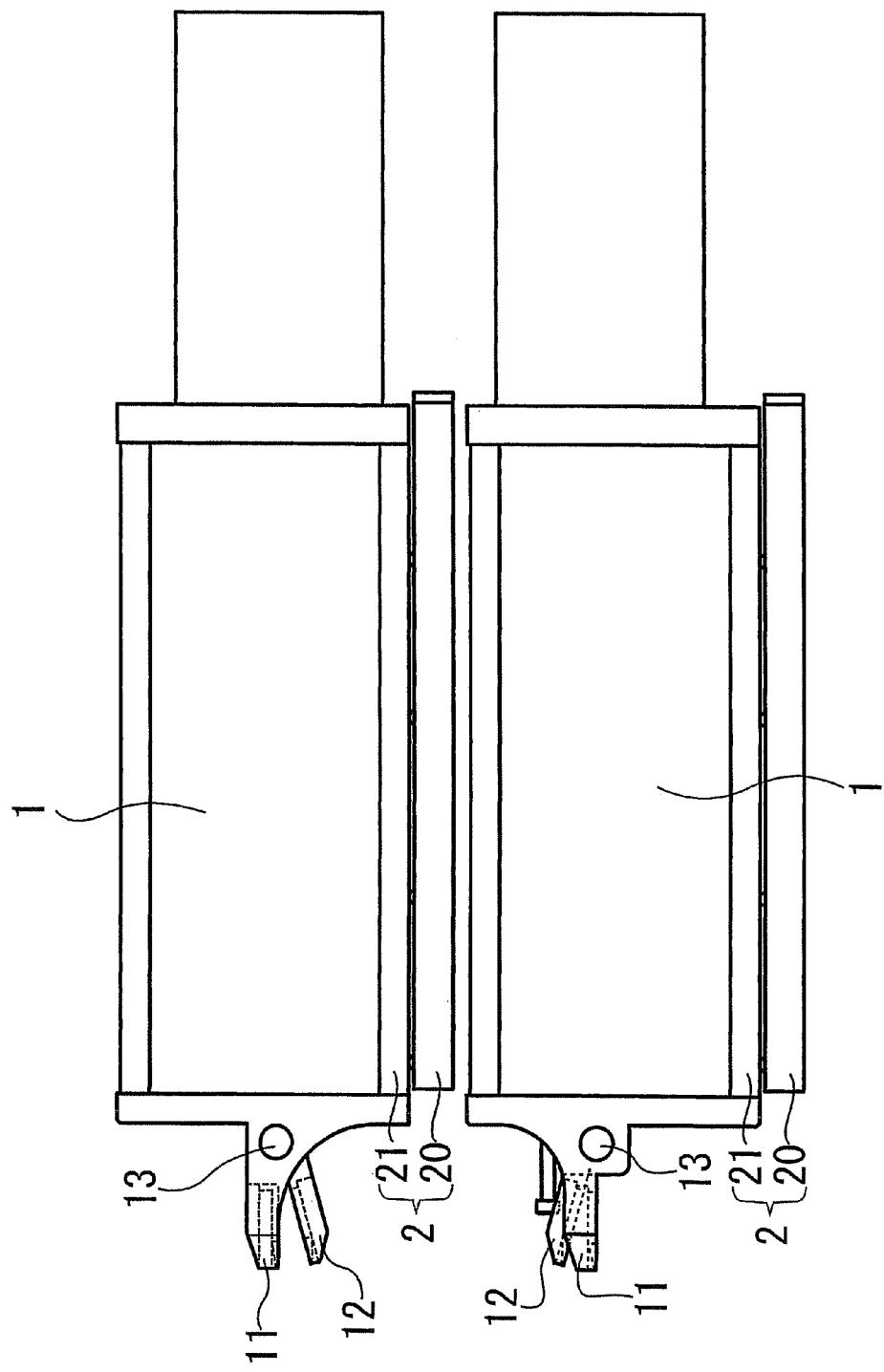
FIG. 2 is a side view of the removing device.
Figure 3:
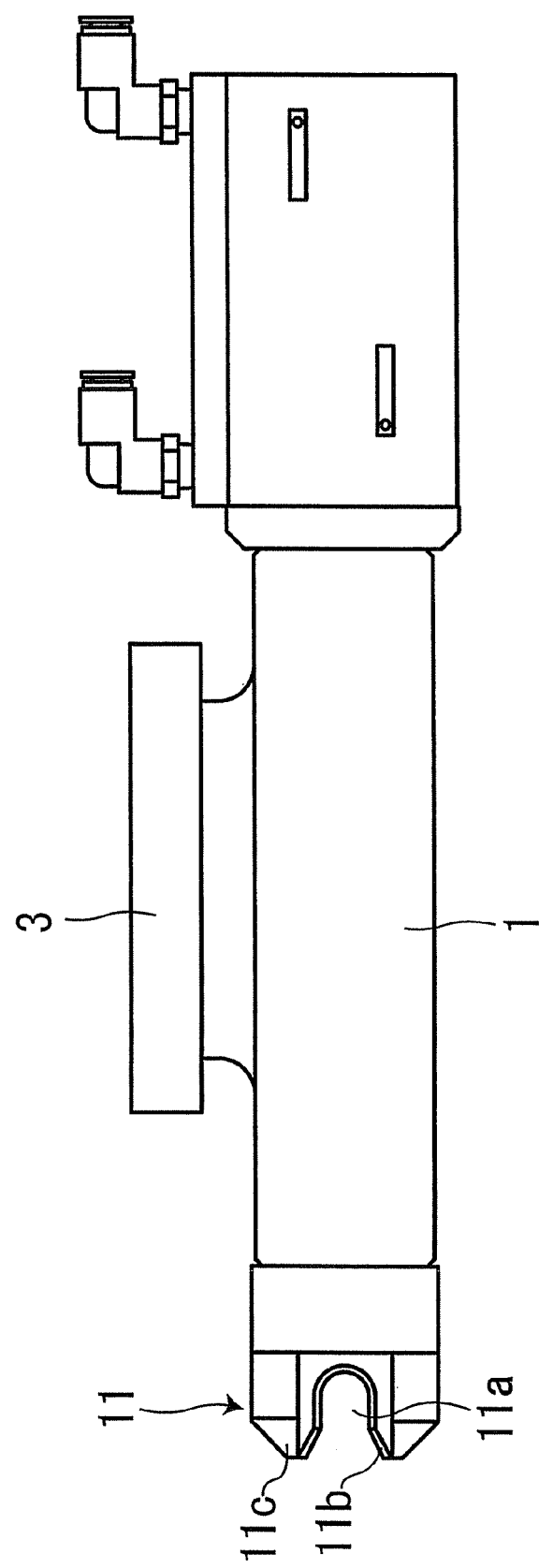
FIG. 3 is a top view of the removing device.
Figure 4:
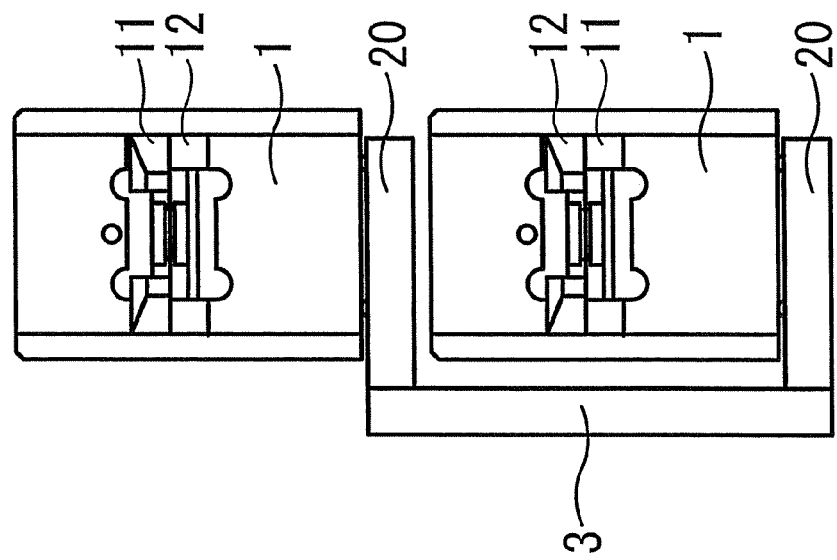
FIG. 4 is a front view of the removing device.

FIG. 12 shows the structure of a shank 90 and an electrode chip 95 of a spot welding machine. The shank 90 is cylindrical. A tapered portion 90a whose outside diameter decreases gradually toward its tip is formed at tip of the shank 90. Two shanks 90 are disposed to oppose each other at the tapered portion 90a. An electrode chip 95 having a cap like shape is fit to this tapered portion 90a. The present invention concerns an electrode chip replacement apparatus for replacing the electrode chip 95 attached to tip of the shank 90 by attachment/detachment.
(Overall Structure)
Hereinafter, a preferred embodiment of the present invention will be described with reference to the accompanying drawings.
FIG. 1 is a perspective view of a swing type electrode chip replacement apparatus 80. This swing type electrode chip replacement apparatus 80 is constructed by mounting an electrode chip replacing means on a swing unit 2 (62). The electrode chip replacing means is constituted of a removing device 1 for removing an electrode chip 95 from tip of the shank 90 and a magazine of electrode chips 60 which accommodates a plurality of the electrode chips 95 in order to attach the electrode chip 95 to tip of the shank 90 of a spot welding machine. As shown in FIG. 1, the removing device 1 and the magazine 60 are disposed adjacent each other. The swing type electrode chip replacement apparatus 80 is positioned proximate to the spot welding machine. That is, the swing type electrode chip replacement apparatus 80 is provided at a position where a welding gun attached to a robot arm, that is, the spot welding machine, can reach.
(Removing Device)
FIG. 2 is a side view of a removing device 1, FIG. 3 is a top view of FIG. 2 and FIG. 4 is a front view of FIG. 2. The removing device 1 is loaded on a movable plate 21 of the swing unit 2. As described in detail later, the removing device 1 is swingable to the right and left with respect to the swing unit 2 and slidable backward. According to the present embodiment, as shown in FIG. 4, two pieces, upper and lower of fixing plates 20 of the swing unit 2 are attached to a bracket 3 such that they are perpendicular to the plate-like bracket 3 erected vertically. In this way, the removing device 1 having the same structure is disposed on the top and bottom. In the meantime, the bracket 3 is mounted on a supporting post 80a of the apparatus 80 installed on the floor of welding line.

At the front end of the removing device 1 are provided the plate-like fixing pawl 11 and the movable pawl 12 which rotates around a shaft portion 13 provided on the base portion of this fixing pawl 11. The movable pawl 12 rotates around the shaft portion 13, so that the movable pawl 12 is opened with respect to the fixing pawl 11 (state of FIG. 2) The detail of a mechanism for the fixing pawl 11 and the movable pawl 12 of this removing device 1 to open/close is described in PCT/JP2004/011688 filed by this inventor (particularly FIG. 9).

Figure 5:
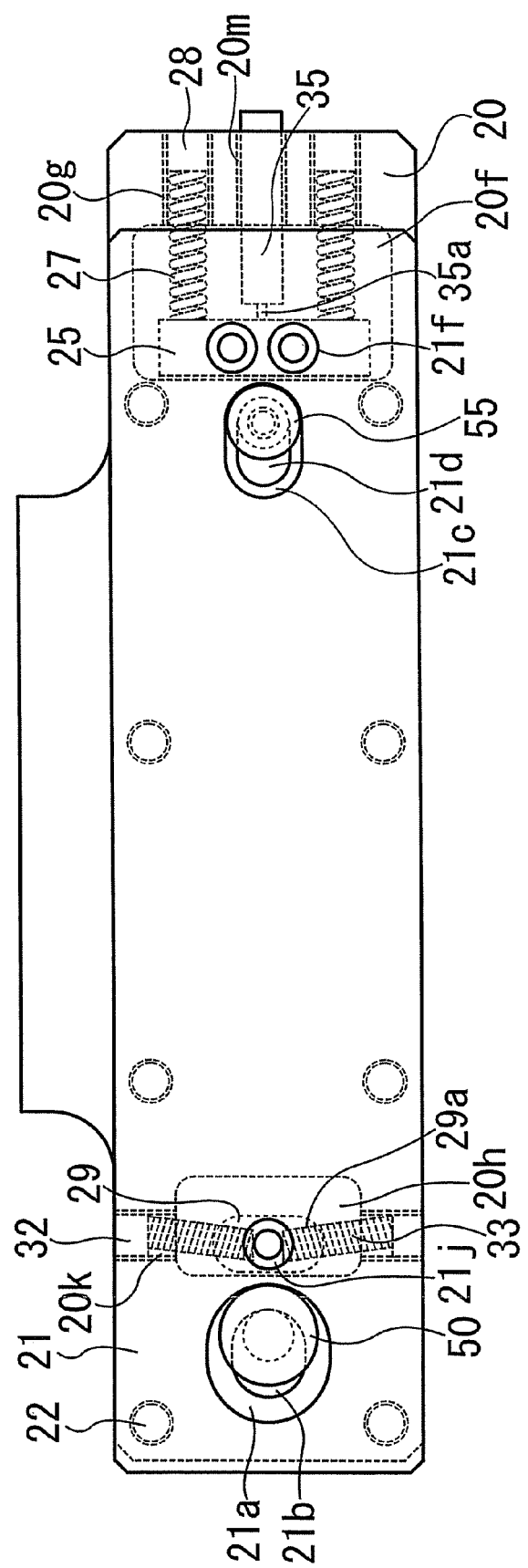
FIG. 5 is a top view of a swing unit.
Figure 6:
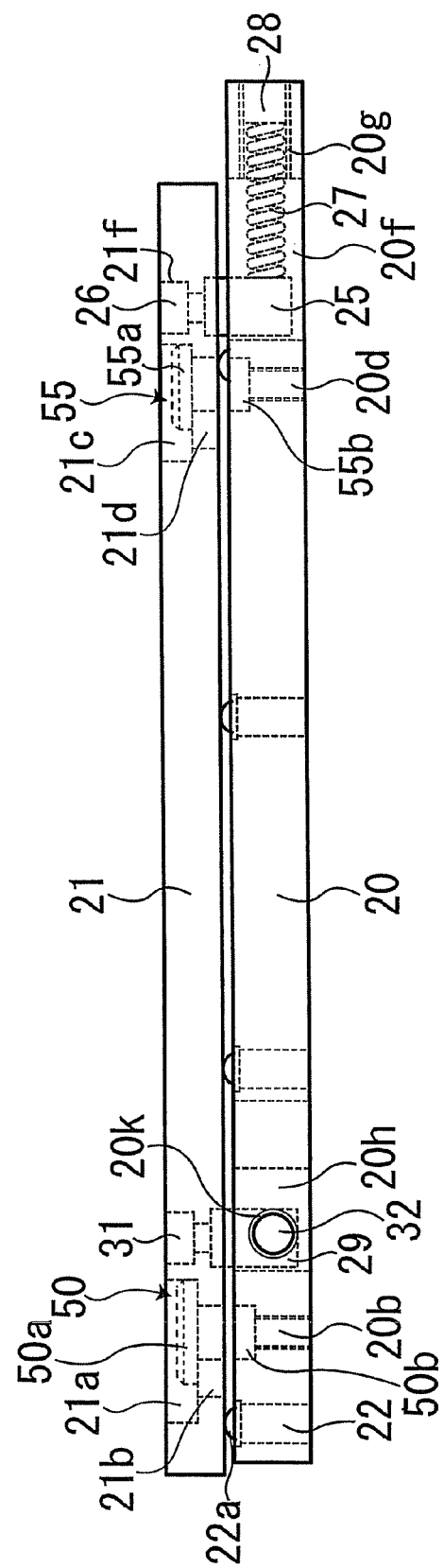
FIG. 6 is a side view of the swing unit.

As shown in FIG. 3, a shank receiving concave portion 11a configured to be dented in a substantially U-like shape is formed in the fixed pawl 11 such that it is open forward. Although the width of this shank receiving concave portion 11a is slightly larger than the outside diameter of the tapered portion 90a of the shank 90, it is smaller than the outside diameter of the electrode chip 95. A shank introduction portion 11b whose width increases gradually toward its front end is formed at tip of the shank receiving concave portion 11a. The shank receiving concave portion and the shank introduction portion are formed also in the movable pawl 12 like the fixed pawl 11. The shank receiving concave portion 11a of the fixed pawl 11 and the shank receiving concave portion of the movable pawl 12 serve as an insertion portion in which tip of the shank 90 of the spot welding machine is to be inserted.
(Swing Unit)
Next, the swing unit 2 will be described. FIG. 5 shows a top view of the swing unit 2 and FIG. 6 shows a side view of the swing unit 2. In FIG. 6, reference numeral 20 denotes a substantially rectangular plate-like fixed plate.

A substantially rectangular plate-like movable plate 21 is disposed on the top face of the fixed plate 20 such that it overlaps. A plurality of ball plungers 22 are embedded in the fixed plate 20 with ball portions 22a directed toward the movable plate 21. As shown in FIG. 5, four pieces and two pieces of the ball plungers 22, totaling eight pieces, are embedded in the fixed plate 20 in the back-forth direction and in the width direction respectively. The ball portions 22a are exposed from the surface of the fixed plate 20, keeping contact with the movable plate 21 so as to hold the movable plate 21 slidably. Because the movable plate 21 is held by the ball plungers 22, a contact area between the movable plate 21 and the ball portions 22a is small and further the surface of the ball portion 22a is smooth. Thus, the movable plate 21 is slidable with respect to the fixed plate 22. The ball portions 22a of the ball plungers 22 move vertically. Consequently, the movable plate 21 moves vertically with respect to the fixed plate 22. In the mean times, the amount of movement of the movable plate 21 with respect to the fixed plate 22 is 0 mm-1.6 mm.

In the meantime, the ball plungers 22 may be embedded in the movable plate 21 so that the ball portions 22a of the ball plungers 22 are brought into contact with the top face of the fixed plate 20.

Alternatively, instead of embedding the ball plungers 22 in the fixed plate 20, it is permissible to embed a plate in which solid lubricant is embedded in the fixed plate 20 such that it is exposed on the surface of the fixed plate 20 so as to hold the movable plate 21 slidably with the aforementioned plate.

The front portion of the movable plate 21 of the swing unit 2 of the present invention is swingable to the right and left with respect to the fixed plate 20 and slidable backward.

However, the front portion of the movable plate 21 is restricted from moving beyond a range in which it swings to the right and left and slides backward with respect to the fixed plate 20. The rear portion of the movable plate 21 is restricted from swinging to the right and left with respect to the fixed plate 20 and from moving beyond the range in which it slides backward. Hereinafter, a restricting means for installing the movable plate 21 to the fixed plate 20 while restricting the front portion of the movable plate 21 from moving beyond a range in which it swings to the right and left and slides backward with respect to the fixed plate 20 and the rear portion of the movable plate 21 from moving beyond a range in which it slides backward with respect to the fixed plate 20, will be described.

Figure 7:
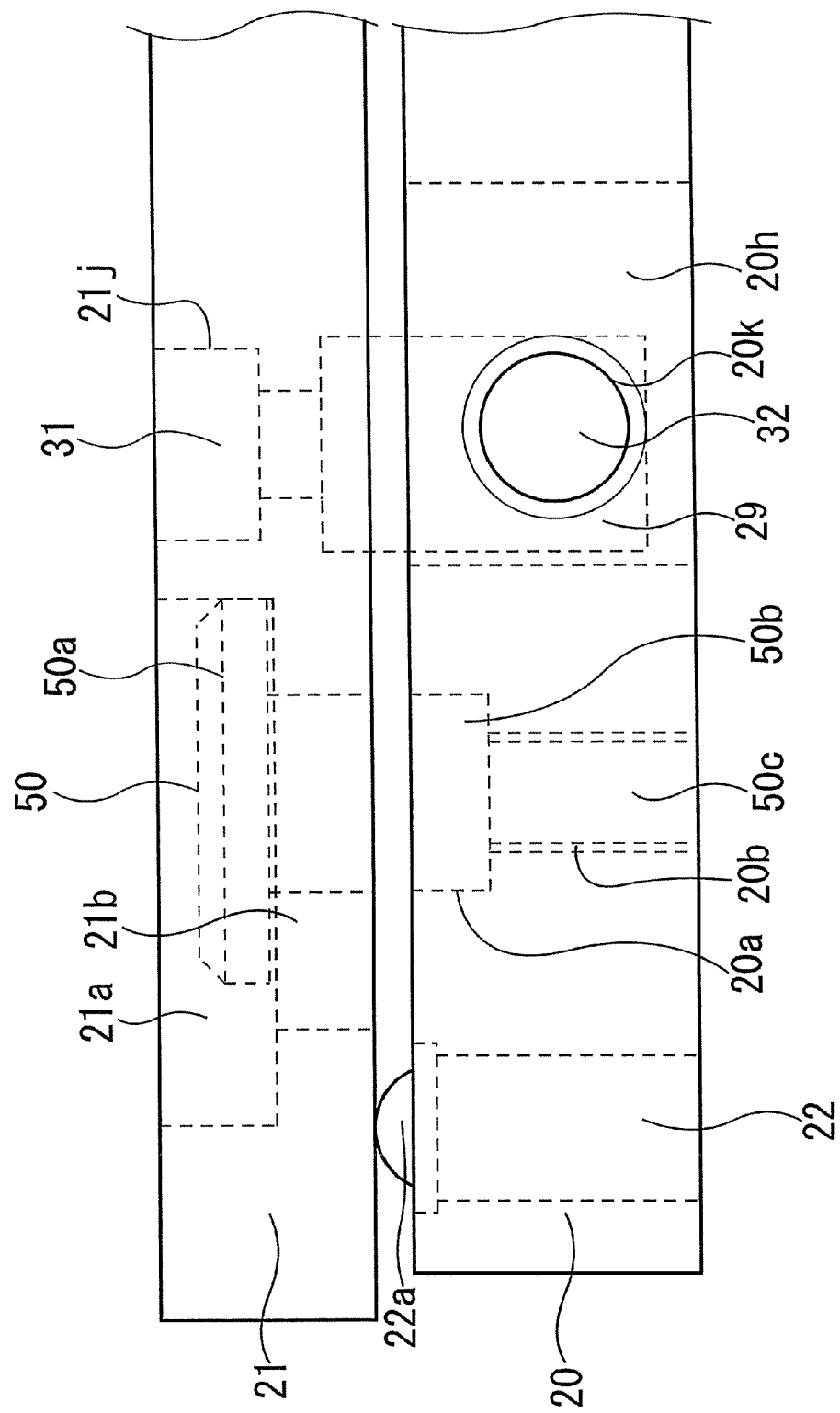
FIG. 7 is a detailed view of a swing concave portion.

FIG. 7 shows a detailed diagram of the front portion of the swing unit 2. As shown in FIG. 5, FIG. 6, and FIG. 7, a swing concave portion 21a having an elongate hole-shaped section is formed in the front portion of the movable plate 21 in such a way that it is dented. The front end in the length direction of the swing concave portion 21a is directed to the front end of the movable plate 21. Although according to this embodiment, the sectional configuration of the swing concave portion 21a is of an elongated hole, it may be of a circular hole and the an elongated hole shape in this specification includes the circular shape.

A swing concave portion through hole 21b having an outer edge smaller than the outer edge of the swing concave portion 21a is formed at the bottom portion of the swing concave portion 21a.

A fixing concave portion 20a having a circular section is formed at a position corresponding to the swing concave portion 21a on the top face of the fixed plate 20 in such a way that it is dented. A screw hole 20b is formed at the bottom portion of this fixing concave portion 20a.

Reference numeral 50 denotes a swing bolt and the outside diameter of a head portion 50a thereof is smaller than the width in the short side direction of the swing concave portion 21a and larger than the width in the short side direction of the swing concave portion through hole 21b and the head portion 50a is accommodated in the swing concave portion 21a. A shaft portion 50b having an outside diameter smaller than the width in the short side direction of the swing concave portion through hole 21b is provided at the bottom portion of the head portion 50a of the swing bolt 50, inserted through the swing concave portion through hole 21b, and embedded in the fixing concave portion 20a.

A screw portion 50c is formed at the bottom portion of the shaft portion 50b and threaded to the screw hole 20b. There is a slight gap (for example, 0.2 mm) between the lower face of the head portion 50a of the swing bolt 50 and the bottom face of the swing concave portion 21a so that the lower face of the head portion 50a of the swing bolt 50 is not fixed to the bottom face of the swing concave portion 21a. With such a structure, the swing bolt 50 and the movable plate 21 can slide to each other. The top face of the head portion 50a is lower than the top face of the movable plate 21 so that the head portion 50a does not protrude from the movable plate 21.

Because the outside diameter of the head portion 50a is smaller than the width in the length direction of the swing concave portion 21a, the front portion of the movable plate 21 can slide in the back-forth direction by an amount corresponding to a difference between the outside diameter of the head portion 50a and the width in the length direction of the swing concave portion 21a. Because the outside diameter of the swing bolt 50a is smaller than the width in the short side direction of the swing concave portion 21a, the front portion of the movable plate 21 can swing to the right and left by an amount corresponding to the difference between the outside diameter of the head 50a and the width in the short side direction of the swing concave portion 21a. In other words, the swing concave portion 21a formed concavely in the movable plate 21 and the swing bolt 50 threaded to the fixed plate 20 restrict a motion of the movable plate 21 of beyond a range in which it swings to the right and left and slides in the back-forth direction.

Figure 8:
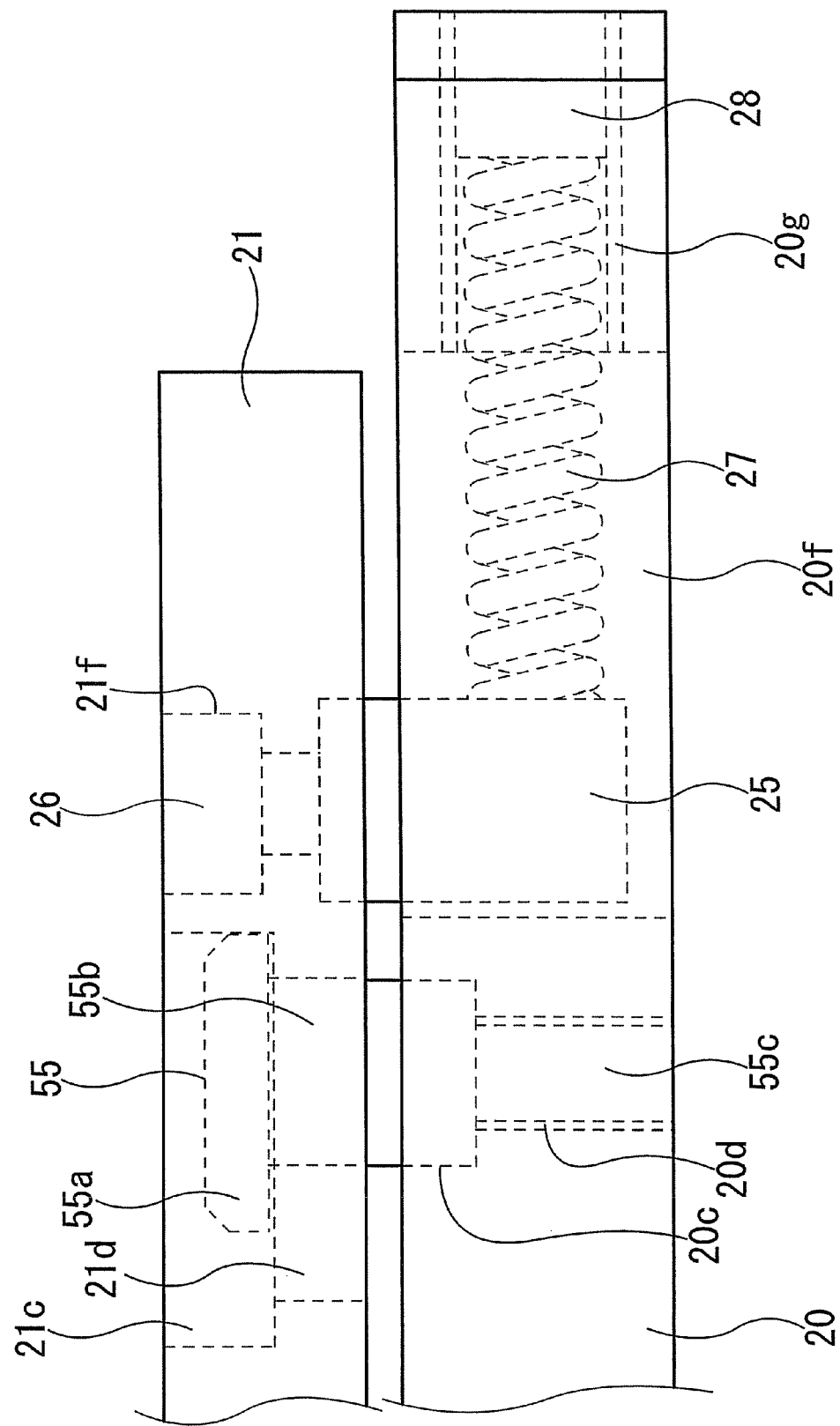
FIG. 8 is a detailed view of a slide concave portion.

FIG. 8 shows a detailed diagram of the rear portion of the swing unit 2. As shown in FIG. 5, FIG. 6 and FIG. 8, an elongated hole shaped slide concave portion 21c whose front end in the length direction is directed to the swing concave portion 21a is formed concavely in the rear portion of the movable plate 21. An elongated hole shaped slide concave portion through hole 21d which is smaller than the external shape of the slide concave portion 21c is formed at the bottom portion of this slide concave portion 21c such that it passes through in a direction to the fixed plate 20.

A fixing concave portion 20c having a circular section is formed concavely at a position corresponding to the slide concave portion 21c of the top face of the fixed plate 20. A screw hole 20d is formed at the bottom portion of this fixed concave portion 20c.

Reference numeral 55 denotes a slide bolt and the outside diameter of a head portion 55a thereof is slightly smaller than the width in the short side direction of the slide concave portion 21c and larger than the width in the short side direction of the slide concave portion through hole 21d, so that it is accommodated in the slide concave portion 21c. The length in the length direction of the slide concave portion 21c is larger than the outside diameter of the slide bolt 55. The bottom portion of the head portion 55a is formed into a shaft portion 55b having a outside diameter smaller than the width in the short side direction of the slide concave portion through hole 21d, inserted through the slide concave portion through hole 21d, and embedded in the fixing concave portion 20c.

The lower portion of the shaft portion 55b is formed into a screw portion 55c and it is threaded to the screw hole 20d. With the screw portion 55c of the slide bolt 55 threaded to the screw hole 20b, there is a slight gap (for example, 0.2 mm) between the lower face of the head portion 55a and the bottom face of the slide concave portion 21c so that the lower face of the head portion 55a and the bottom face of the slide concave portion 21c are not fixed to each other. With such a structure, the slide bolt 55 and the movable plate 21 are slidable to each other. The top face of the head portion 55a of the slide bolt 55 is lower than the top face of the movable plate 21 so that the head portion 55a of the slide bolt 55 does not protrude from the movable plate 21.

Because the outside diameter of the head portion 55a is smaller than the width in the length direction of the slide concave portion 21c, the rear portion of the movable plate 21 can slide in the back-forth direction by an amount corresponding to a difference between the outside diameter of the head portion 55a and the width in the length direction of the slide concave portion 21c. In other words, the slide concave portion 21c formed concavely in the movable plate 21 and the slide bolt 55 secured to the fixed plate 20 restrict a motion of the rear portion of the movable plate 21 from surpassing a range in which it slides in the back-forth direction with respect to the fixed plate 20. On the other hand, because the outside shape of the head portion 55a is only a little smaller than the dimension in the short side direction of the slide concave portion 21c, the motion of the movable plate 21 in the right-left direction is restricted by the slide bolt 55 and the slide concave portion 21c, so that the rear portion of the movable plate 21 does not move in the right-left direction.

In this way, due to provision of the restricting means, the movable plate 21 can be mounted to the fixed plate 22 such that the front portion of the movable plate 21 is swingable in the right-left direction with respect to the fixed plate 20 and be slidable backward.

In the swing unit 2 described above, the swing concave portion 21a and the slide concave portion 21c are formed in the movable plate 21 and the swing bolt 50 and the slide bolt 55 are secured to the fixed plate 20. The swing unit for use in the present invention is not restricted to this structure, and needless to say, the swing unit may be so constructed that the swing concave portion and the slide concave portion are formed in the fixed plate 20 and the swing bolt 50 and the slide bolt 55 are secured to the movable plate 21 so that the front end of the movable plate 21 swings in the right-left direction with respect to the fixed plate 20 and slides in the back-forth direction.

The movable plate 21 of the swing unit 2 of the present invention is always urged to be positioned at the forefront portion of a slidable range with respect to the fixed plate 20. Hereinafter, an urging means for urging the movable plate 21 to be always positioned at the forefront portion of the slidable range with respect to the fixed plate 20 will be described.

As shown in FIG. 5, FIG. 6 and FIG. 8, a substantially rectangular space 20f is formed in the rear portion of the fixed plate 20. In this embodiment, the space 20f is formed in the rear portion of the fixed plate 20 such that it goes therethrough. In the meantime, the space 20f may be formed concavely such that it is open to the movable plate 21 side.

A bar-like member 25 is mounted to the movable plate 21 such that it invades into the space 20f. In this embodiment, mounting holes 21f are formed in the rear portion of the movable plate 21 in parallel and the bar-like member 25 is mounted to the movable plate 21 with hexagon socket head bolt 26 accommodated in the mounting hole 21f.

As shown in FIG. 5, FIG. 6, and FIG. 8, coil springs 27 for urging the bar-like member 25 forward are mounted to the rear portion of the fixed plate 20. In this embodiment, spring receiving portions 20g are formed to communicate with the space 20f from the rear end of the fixed plate 20 such that they go therethrough and rear ends of the spring receiving portions 20g are closed with set bolts 28. Then, the coil springs 27 are attached to the rear portion of the fixed plate 20 such that rear ends of the coil springs 27 are received by the spring receiving portions 20g. The bar-like member 25 is urged forward by the coil springs 27 attached to the fixed plate 20, so that the movable plate 21 is always urged forward with respect to the fixed plate 20.

Although in this embodiment, the space 20f is formed in the fixed plate 20 side and the bar-like member 25 is attached to the movable plate 21 side, it is permissible to form the space in the movable plate 21 side and attach the bar-like member to the fixed plate 20 side so that the bar-like member is urged by the coil springs 27 attached to the movable plate 21 side to urge the movable plate 21 forward with respect to the fixed plate 20.

The front portion of the movable plate 21 of the swing unit 2 of the present invention is configured to return to an intermediate position of a swing range with respect to the fixed plate 20. Hereinafter, a restoring means for the front portion of the movable plate 21 to return to the intermediate position of the swing range with respect to the fixed plate 20 will be described.

As shown in FIG. 5, FIG. 6 and FIG. 7, a space 20h having a substantially rectangular section is formed in the front portion of the fixed plate 20. In this embodiment, the space 20h is formed in the front portion of the fixed plate 20 such that it goes therethrough. In the meantime, the space 20h may be formed concavely to be open to the movable plate 21 side. In this embodiment, the space 20h is provided in the back of the screw hole 20b. The space 20h may be provided in front of the screw hole 20b.

The movable plate 21 is provided with block-like members 29 so that they invade into the space 20h. The block-like member 29 is mounted in the center portion in the width direction of the movable plate 21. According to this embodiment, a mounting hole 21j is formed in the front portion of the movable plate 21 and the block-like member 29 is installed to the movable plate 21 with hexagon socket head bolt 31 accommodated in this mounting hole 21j.

In the front portion of the fixed plate 20, a spring receiving portion 20k which communicates with the space 20f is formed such that it communicates with the space 20f from both side faces of the fixed plate 20. Stopper bolts 32 are fit to the spring receiving portion 20k to close side face sides thereof on the fixed plate 20.

A spring receiving concave portion 29a is formed concavely on both ends of the block-like member 29, that is, in a portion corresponding to the spring receiving portion 20k.

Reference numeral 33 denotes a coil spring, and both ends of the coil spring are attached such that they are accommodated in the spring receiving portion 20k and the spring receiving concave portion 29a. The block-like member 29 is urged from both sides in the width direction of the fixed plate 20 by the coil spring 33, so that the front portion of the movable plate is always returned to the center in the width direction of the fixed plate 20.

By the structure described in detail above, the front portion of the movable plate 21 of the swing unit 2 swings to the right and left with respect to the fixed plate 20 and slides in the back-forth direction. In the meantime, according to this embodiment, the movable plate 21 slides up to 6 mm in the back-forth direction with respect to the fixed plate 20. In this embodiment, the portion having the swing concave portion 21a in the front portion of the movable plate 21 swings 2 mm each to the right and left with respect to the fixed plate 20.

Figure 9:
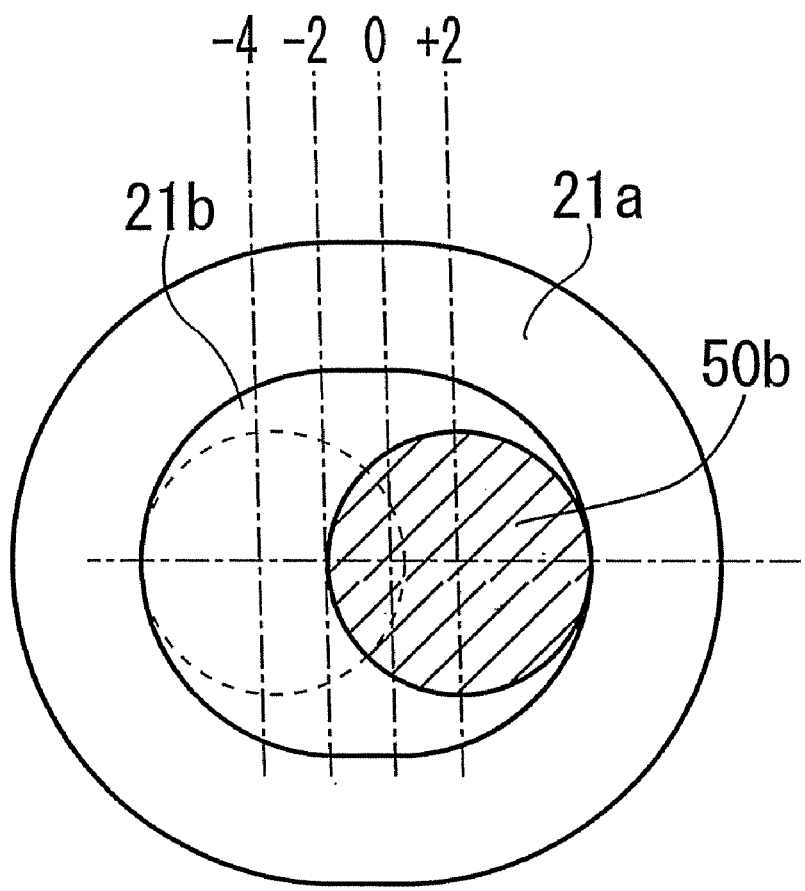
FIG. 9 is an explanatory diagram of a relative positional relationship between a fixed plate and a shaft.

FIG. 9 shows an explanatory diagram of a relative positional relationship between the fixed plate 21 and the shaft portion 50b. The movable plate 21 is always urged forward with respect to the fixed plate 20. In this condition, the center of the shaft portion 50b of the swing bolt 50 is positioned at +2 in FIG. 9.

As shown in FIG. 5, a limit switch 35 is mounted on the rear portion of the fixed plate 20. According to this embodiment, the limit switch 35 is mounted such that it is buried in a limit switch mounting hole 20m which communicates with the space 20h from the rear end of the fixed plate 20. A detection portion 35a of this limit switch 35 is in contact with the bar-like member 25. This limit switch 35 detects a position in the back-forth direction of the movable plate 21 with respect to the fixed plate 20.

(Operation of the Invention)

Next, an operation of the present invention will be described. When replacing the electrode chip 95 attached to the tapered portion 90a of the shank 90, the tapered portion 90a of the shank 90 is inserted into the shank receiving concave portion (11a) formed in the fixed pawl 11 and the movable pawl 12 by operating the robot arm and after bringing the tapered portion 90a of the shank 90 into contact with the bottom portion of the shank receiving concave portion (11a), the movable pawl 12 is rotated to open the movable pawl 12 from the fixed pawl 11. At this time, the electrode chip 95 is removed from the tapered portion 90a of the shank 90.

To securely contact the tapered portion 90a of the shank 90 with the shank receiving concave portion (11a), after the tapered portion 90a of the shank 90 is brought into a contact with the shank receiving concave portion (11a), it is pressed thereinto for a predetermined distance. Because the movable plate 21 equipped with the removing device 1 slides in the back-forth direction with respect to the fixing plate 20, after the tapered portion 90a of the shank 90 makes contact with the bottom portion of the shank receiving portion (11a), it can be pushed thereinto for a predetermined distance. The predetermined distance over which the removing device 1 slides backward is ⅓ (2 mm) of a range (6 mm) in which the movable plate 21 slides in the back-forth direction with respect to the fixed plate 20. When the electrode chip 95 is removed from the tapered portion 90a of the shank 90, the shaft portion 50b is positioned at 0 in FIG. 9. That is, the position 0 in FIG. 9 serves as a home position when the electrode chip 95 is removed from the tapered portion 90a of the shank 90.

When the shank 90 is bent in the right-left direction with respect to the removing device 1, if it is attempted to insert the tapered portion 90a of the shank 90 into the shank receiving portion (11a), the tapered portion 90a of the shank 90 is introduced and inserted into the shank receiving concave portion (11a) while keeping a contact with the shank introduction portion 11b, because the front portion of the movable plate 21 is swingable in the right-left direction with respect to the fixed plate 20. In this condition, if the movable pawl 12 is opened from the fixed pawl 11, the electrode chip 95 is removed from the shank 90. Even if the shank 90 is bent in the right-left direction, the electrode chip 95 can be removed without damaging the shank 90 because the removing device 1 mounted on the movable plate 21 swings in the right-left direction.

If the tapered portion 90a of the shank 90 is bent backward of the removing device 1, the tapered portion 90a of the shank 90 is never bent or damaged by being pressed at the bottom portion of the shank receiving concave portion (11a), because the fixed pawl 11 and the movable pawl 12 can slide further in the backward direction of the removing unit 1 with respect to the home position for removal (position 0 in FIG. 9).

Even if the tapered portion 90a of the shank 90 is bent forward of the removing device 1, the fixed pawl 11 and the movable pawl 12 follow up the tapered portion 90a of the shank 90 so as to bring the tapered portion 90a of the shank 90 into a contact with the bottom portion of the shank receiving concave portion (11a), because the home position for removal is located at a position where it slides 2 mm forward from a position of +2 to a position of 0 in FIG. 8. Consequently, a removal failure of the electrode chip 95 never occurs.

As described above, the movable plate 21 is held by the ball plunger 22 so that the movable plate 21 is moved vertically with respect to the fixed plate 20. Consequently, when the electrode chip 95 is removed from the tapered portion 90a of the shank 90, the removing device 1 moves following up in a vertical direction so as to remove the electrode chip 95 from the shank 90 without damaging the shank 90.

On the other hand, if the shank 90 is bent largely, when the tapered portion 90a of the shank 90 is not introduced to the shank introduction portion (11b) of the fixed pawl 11 and the movable pawl 12 so that the tapered portion 90a of the shank 90 makes contact with the front end portion (11c) of the fixed pawl 11 and the movable pawl 12 (shown in FIG. 3) and consequently, the removing device 1 slides backward. If it slides more than 2 mm backward from the home position for removal (that is, when it slides further backward from a position of −2 in FIG. 9), the limit switch 35 detects an abnormality and stops a robot arm equipped with a welding gun in order to prevent the shank 90 and the removing device 1 from being damaged and at the same time, detect an abnormality of the shank 90.

According to this embodiment, both the upper and lower removing units 1 are mounted on the swing unit 2. However, there is no problem if only the upper removing device 1 is mounted on the swing unit 2 so that only the front portion of the upper removing device 1 can swing in the right-left direction and slide in the back-forth direction. In this case, if the shank 90 is bent in the right-left direction or in the back-forth direction and the tapered portions 90a of the upper shank 90 and the lower shank 90 deviate, the motion of the shank 90 is corrected so that the tapered portion 90a of the lower shank 90 is disposed at the bottom portion of the shank receiving concave portion (11a) of the lower removing device 1. If the tapered portion 90a of the lower shank 90 is disposed at the bottom portion of the shank receiving concave portion (11a) after the correction, the tapered portion 90a of the upper shank 90 is also disposed at the bottom portion of the shank receiving concave portion (11a) because the front portion of the upper removing device 1 can swing in the right-left direction and slide in the back-for the direction.

Of course, only the lower removing device 1 may be equipped with the swing unit 2. If the shank 90 is bent in the right-left direction or in the back-forth direction and consequently, the tapered portions of the upper shank 90 and the lower shank 90 deviate from each other, the motion of the shank 90 is corrected so that the tapered portion 90a of the upper shank 90 is disposed at the bottom portion of the shank receiving concave portion (11a).

(About Magazine of Electrode Chips)

Figure 10:
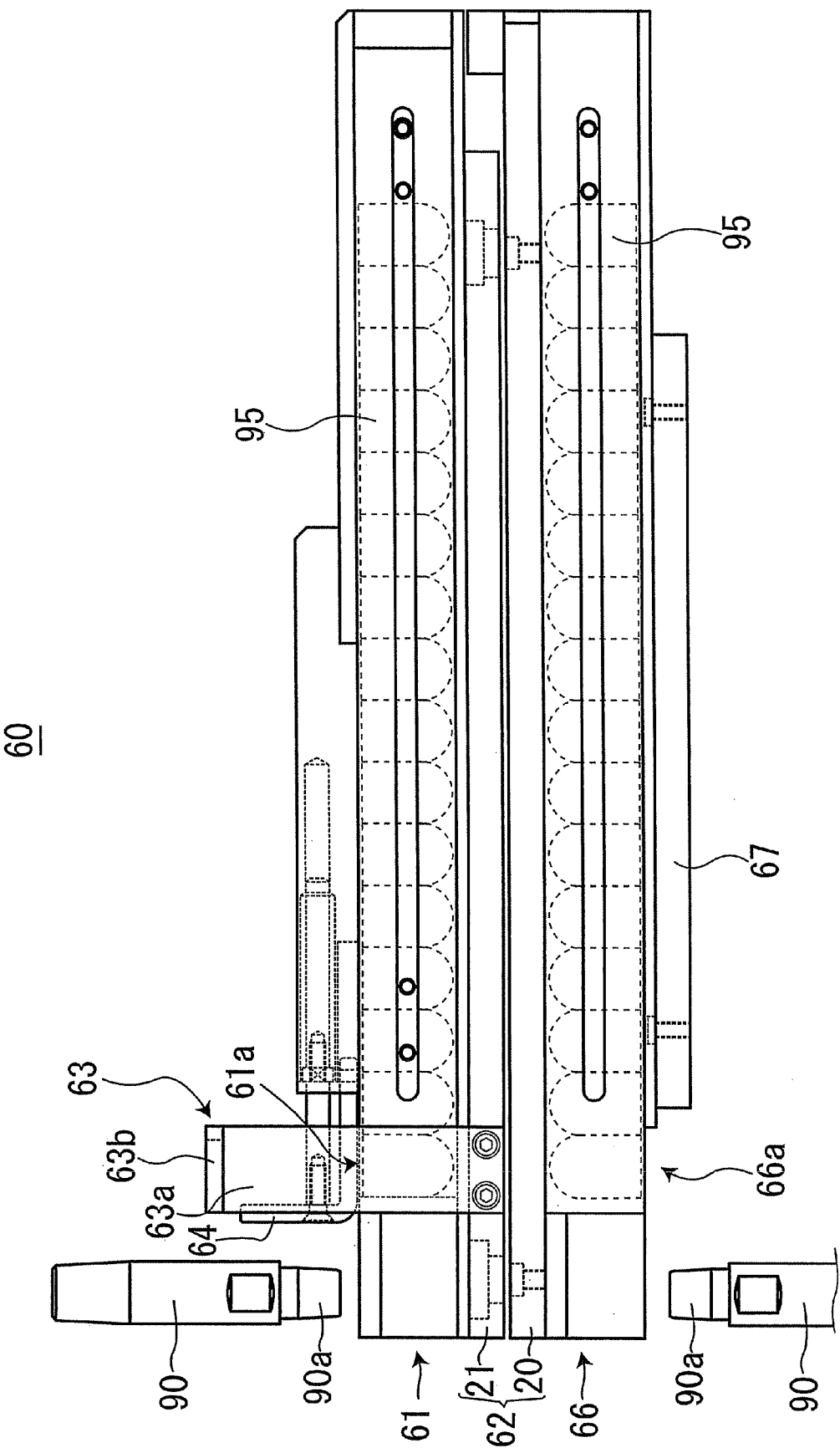
FIG. 10 is a side view of a magazine of electrode chips.
Figure 11:
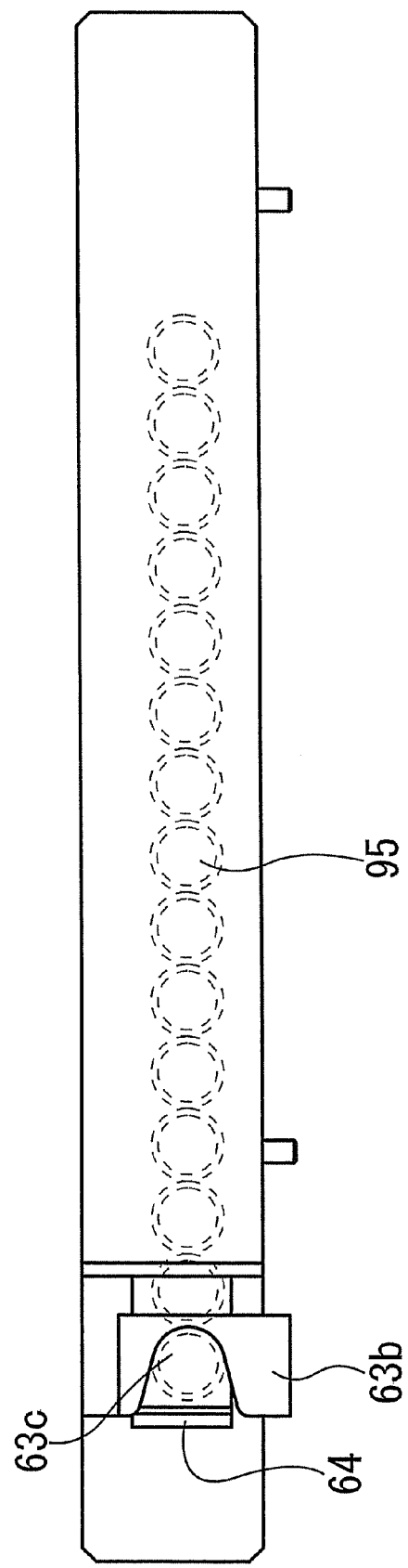
FIG. 11 is a top view of the magazine of electrode chips.

FIG. 10 shows a side view of the magazine of electrode chips 60 and FIG. 11 shows a front view of the magazine 60 in order to explain a magazine of electrode chips. The magazine of electrode chips 60 is comprised of an upper side magazine of electrode chips 61 for attaching the electrode chip 95 to the upper shank 90 and a lower side magazine of electrode chips 66 for attaching the electrode chip 95 to the lower shank 90. An upward open supply port 61a is provided in the front portion of the magazine 61. A downward open supply port 66a is provided in the front portion of the magazine 66.

A plurality of electrode chips 95 is accommodated in line within the upper side magazine of electrode chips 61 and the lower side magazine of electrode chips 66 and they are supplied to the supply ports 61a, 66a successively by a spring force.

Reference numeral 62 denotes a swing unit, which has basically the same structure as the swing unit 2. The upper side magazine of electrode chips 61 is loaded on the movable plate 21 of the swing unit 62.

A guide 63 is attached to the side face of a front portion of the movable plate 62 of the swing unit 62. This guide 63 is comprised of a plate portion 63a extending upward from the side face of the front portion of the movable plate 21 and a guide portion 63b that is mounted on the upper end of the plate portion 63a and is disposed on the magazine 61. A shank introduction concave portion 63c which is open such that its width increases toward the front side is formed in the guide portion 63b. The bottom portion of the shank introduction concave portion 63c is located above the supply port 61a. The shank introduction concave portion 63c serves as an insertion portion in which tip of the shank 90 of a spot welding machine is to be inserted.

Because the magazine 61 is mounted on the movable plate 21 of the swing unit 62, the front portion of the magazine 61 can swing in the right-left direction and slide backward. As described above, because the movable plate 21 is held on the ball plunger 22 and the magazine 61 is mounted on the movable plate 21 of the swing unit 62, the magazine 61 can move vertically.

Reference numeral 64 denotes a cover member, which is mounted slidably in the back-forth direction on the upper side magazine of electrode chips 61. The cover member 64 is urged forward of the magazine 61 so as to cover the supply port 61a in the magazine 61 thereby preventing foreign matter from invading into the supply port 61a. When the shank 90 makes contact therewith, the cover member 64 slides backward so that the supply port 61a is exposed.

The lower side magazine of electrode chips 66 is disposed below the upper side magazine of electrode chips 61 and mounted on a mounting plate 67.

The fixing plate 20 and the mounting plate 67 of the swing unit 62 provided with the upper side magazine of electrode chips 61 are mounted on a mounting bracket 69. The mounting bracket 69 is mounted to a supporting post 80a of the swing type electrode replacement apparatus 80.

To attach the electrode chip 95 to the tapered portion 90a of the shank 90, the robot arm is moved to move the tapered portion 90a of the shank 90 to the supply port 61a and the supply port 66a, and the shanks 90 are fit thereto to attach the electrode chip 95 to the tapered portion 90a of the shank 90.

If the shank 90 is bent in the right-left direction or in the back-forth direction of the removing device 1, the shank 90 makes contact with the shank introduction concave portion 63c in the guide 63 and the magazine 61 swings in the right-left direction or slides in the back-forth direction, so that the tapered portion 90a of the shank 90 is disposed over the supply port 61a.

According to this embodiment, only the upper side magazine of electrode chips 61 is mounted on the swing unit 62 so that only the front portion of the magazine 61 can swing in the right-left direction and slide in the back-forth direction. If the shank 90 is bent in the right-left direction or in the back-forth direction and the tapered portions 90a of the upper side shank 90 and the lower side shank 90 deviate from each other, the motion of the shank 90 is corrected so that the tapered portion 90a of the lower side shank 90 is disposed below the supply port 66a. If the tapered portion 90a of the lower side shank 90 is disposed below the supply port 66a, the tapered portion 90a of the upper side shank 90 comes into contact with the shank introduction concave portion 63c in the guide 63 and then, the front portion of the magazine 61 is introduced to the bottom portion of the shank introduction concave portion 63c while swinging in the right-left direction or sliding in the back-forth direction, and the tapered portion 90a of the upper side shank 90 is disposed over the supply port 61a.

In the meantime, there is no problem if only the lower side magazine of electrode chips 66 is mounted on the swing unit while the guide is attached to the movable plate of the lower side swing unit. In this case, if the shank 90 is bent in the right-left direction or in the back-forth direction and the tapered portions 90a of the upper side shank 90 and the lower side shank 90 deviate from each other, the motion of the shank 90 is corrected so that the tapered portion 90a of the upper side shank 90 is disposed over the supply port 61a.

Of course, both the upper side magazine of electrode chip 61 and the lower side magazine of electrode chips 66 may be mounted on the swing unit. In this case, time and effort for correcting the motion of the shank 90 can be saved.

As described above, the swing unit 62 capable of swinging in the right-left direction and sliding in the back-forth direction is mounted on the magazine 61 and the guide 63 for introducing tip of the shank 90 to the supply port 61a is provided on the movable plate 21 of the swing unit 62. Consequently, the tapered portion 90a of the shank 90 can be disposed over the supply port 61a and below the supply port 66a, thereby preventing a failure in mounting the electrode chip 95 to the tapered portion 90a of the shank 90. As described above, because the magazine 61 moves vertically, the magazine 61 moves vertically following up the shank 90 when tip of the shank 90 is introduced to the supply port 61a or the electrode chip 95 is mounted to tip of the shank 90. As a result, the electrode chip 95 can be attached to the shank 90 securely without damaging the shank 90.

After the electrode chip 95 is attached to the tapered portion 90a of the shank 90, a sensing plate 70 disposed between the removing device 1 and the magazine 60 is pressurized with the electrode chips 95 located on both sides thereof so as to secure attachment of the electrode chip 95 to the shank 90.

In the meantime, if the spot welding machine is not a welding gun mounted to a robot arm but a stationary gun, the swing type electrode chip replacement apparatus 80 may be mounted on the robot arm and this swing type electrode chip replacement apparatus 80 may be moved up to the spot welding machine of the stationary gun so as to attach/detach the electrode chip 95 to/from the shank 90 of the spot welding machine.

Although the present invention has been described as regards an embodiment which can be considered the most practical and preferable at this time, the present invention is not restricted to the embodiments disclosed in this specification but may be modified appropriately within a range not conflicting with the gist or philosophy of the invention which can be read from the scope of claims and the entire specification and it should be understood that the swing type electrode chip replacement apparatus accompanied with such a modification is also included in the technical scope.

The invention claimed is:

1. A swing type electrode chip replacement apparatus comprising:

A fixed plate (20) located in the vicinity of a spot welding machine; and a movable plate (21) which is capable of sliding in the back-forth direction while a front portion thereof is capable of swinging in the right-left direction, the movable plate (21) being disposed on the fixing plate (20), wherein the movable plate (21) is equipped with an electrode chip replacement means for attaching or detaching an electrode chip (95) to/from tip of the shank (90) of a spot welding machine, the swing type electrode chip replacement apparatus being capable of sliding in the back-forth direction and swinging in the right-left direction when the shank (90) makes a contact with the electrode chip replacement means.

2. The swing type electrode chip replacement apparatus according to claim 1 further comprising a restricting means for attaching the movable plate (21) to the fixed plate (20) slidably while restricting a motion of the front portion of the movable plate (21) from surpassing a range in which it swings in the right-left direction and slides backward with respect to the fixed plate (20) and a motion of the rear portion of the movable plate (21) from surpassing a range in which it slides backward with respect to the fixed plate (20).

3. The swing type electrode chip replacement apparatus according to claim 2 wherein the restricting means is so constructed that a swing concave portion (21a) having an elongated hole shaped section is formed concavely in the front portion of any one of the movable plate (21) and the fixed plate (20); a swing concave portion through hole (21b)

having an outer edge that is smaller than the outer edge of the swing concave portion (21*a*) is formed at the bottom portion of the swing concave portion (21*a*) such that it goes therethrough; a swing bolt (50), which has a head portion (50*a*) accommodated within the swing concave portion (21*a*) and is smaller than the width dimension of the swing concave portion (21*a*) and larger than the width dimension of the swing concave portion through hole (21*b*) is inserted into the swing concave portion through hole (21*b*) and secured to the other one of the movable plate (21) and the fixed plate (20); a slide concave portion (21*c*) having an elongated hole shaped section whose front end in the length direction is directed toward the swing concave portion (21*a*) is formed concavely in the rear portion of one of the movable plate (21) and the fixed plate (20); a slide concave portion through hole (21*d*), which is smaller than the outer edge of the slide concave portion (21*c*) is formed at the bottom portion of the slide concave portion (21*c*) such that it goes therethrough; and a slide bolt (55), which has the head portion (55*a*) accommodated within the slide concave portion (21*c*) and is smaller than the width dimension of the slide concave portion (21*c*) and larger than the width dimension of the slide concave portion through hole (21*d*), is inserted into the slide concave portion through hole (21*d*) and secured to the other one of the movable plate (21) and the fixed plate (20).

4. The swing type electrode chip replacement apparatus according to claim 1 further comprising an urging means for urging the movable plate (21) forward of the fixed plate (20), the movable plate (21) being always located at the forefront portion of a range in which the movable plate (21) is slidable with respect to the fixed plate (20).

5. The swing type electrode chip replacement apparatus according to claim 4 wherein the urging means is so constructed that a space (20*f*) which is open to a face opposing one of the movable plate (21) and the fixed plate (20) is formed in the other one of the movable plate (21) and the fixed plate (20); a bar-like member (25) is mounted to one of the movable plate (21) and the fixed plate (20) such that the bar-like member (25) invades into the space (20*f*) while a coil spring (27) for urging the bar-like member (25) is mounted to the other one of the movable plate (21) and the fixed plate (20).

6. The swing type electrode chip replacement apparatus according to claim 1 further comprising a restoring means for restoring the front portion of the movable plate (21) to an intermediate portion of a swing range thereof with respect to the fixed plate (20).

7. The swing type electrode chip replacement apparatus according to claim 6 wherein the restoring means is comprised of a block-like member (29) mounted on a central portion in the width direction of one of the movable plate (21) and the fixed plate (20) and coil springs (33) mounted to the other one of the movable plate (21) and the fixed plate (20) for urging the block-like member (29) from both sides in the width direction.

8. The swing type electrode chip replacement apparatus according to claim 1 wherein a ball plunger (22) is buried in one of the fixed plate (20) and the movable plate (21) so that the ball portion (22*a*) of the ball plunger (22) makes contact with the other one of the fixed plate (20) and the movable plate (21), the movable plate (21) being slidable to the fixed plate (20).

9. The swing type electrode chip replacement apparatus according to claim 1 further comprising a limit switch (35) for detecting a position in the back-forth direction of the movable plate (21) with respect to the fixed plate (20).

10. The swing type electrode chip replacement apparatus according to claim 1 wherein the electrode chip replacement means is a removing device (1) for fetching out an electrode chip (95) from the tip of a shank (90) of a spot welding machine.

11. The swing type electrode chip replacement apparatus according to claim 1 wherein the electrode chip replacement means is a magazine (61) for the electrode chips, which supplies the tip of a shank (90) of a spot welding machine with the electrode chip (95).

\* \* \* \* \*